(12) United States Patent
Spijker et al.

(10) Patent No.: US 7,942,729 B2
(45) Date of Patent: May 17, 2011

(54) GIZZARD PEELER AND METHOD OF PEELING A GIZZARD

(75) Inventors: Remco Spijker, Oostzaan (NL); Tom Cornelis Jansen, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 12/773,532

(22) Filed: May 4, 2010

(65) Prior Publication Data
US 2010/0279593 A1 Nov. 4, 2010

(30) Foreign Application Priority Data

May 4, 2009 (NL) ...................................... 2002836

(51) Int. Cl.
*A22C 21/06* (2006.01)
(52) U.S. Cl. ...................................... 452/111
(58) Field of Classification Search .................. 452/106, 452/107, 110–115, 118, 123, 134, 160
See application file for complete search history.

(56) References Cited

U.S. PATENT DOCUMENTS

| | | | |
|---|---|---|---|
| 4,215,450 A | | 8/1980 | Poss |
| 4,608,732 A | * | 9/1986 | Hill et al. ........................ 452/114 |
| RE32,402 E | * | 4/1987 | Graham et al. ................ 452/117 |
| 4,691,410 A | * | 9/1987 | Risser et al. ................... 452/114 |
| 4,748,722 A | * | 6/1988 | Risser et al. ................... 452/111 |
| 4,799,292 A | | 1/1989 | Harben, III |
| 5,041,052 A | * | 8/1991 | Conner et al. ................. 452/106 |
| 5,041,053 A | * | 8/1991 | Ellis et al. ..................... 452/106 |
| 5,098,336 A | | 3/1992 | DeLong |
| 5,549,521 A | * | 8/1996 | van den Nieuwelaar et al. ............................. 452/118 |
| 5,707,280 A | * | 1/1998 | Tieleman et al. ............. 452/117 |
| 6,599,179 B1 | * | 7/2003 | Hazenbroek et al. ......... 452/117 |
| 7,066,806 B2 | * | 6/2006 | de Heer et al. ................ 452/150 |
| 7,500,910 B2 | * | 3/2009 | Sorensen et al. .............. 452/117 |

OTHER PUBLICATIONS

Search report for 2002836, dated Dec. 7, 2009.

* cited by examiner

*Primary Examiner* — Thomas Price
(74) *Attorney, Agent, or Firm* — Dority & Manning, P.A.

(57) ABSTRACT

The invention relates to a gizzard peeler comprising a series of rollersets, each rollerset comprising a first roller and a second roller that in use rotate in opposite directions, wherein the rollersets collectively form a cylindrical wall of a rotatable drum or form part of such a wall, whereby the drum is provided at its outer circumference with a guide and pressure device for guiding and pressing a gizzard along at least a part of the drum's outer circumference.

10 Claims, 4 Drawing Sheets

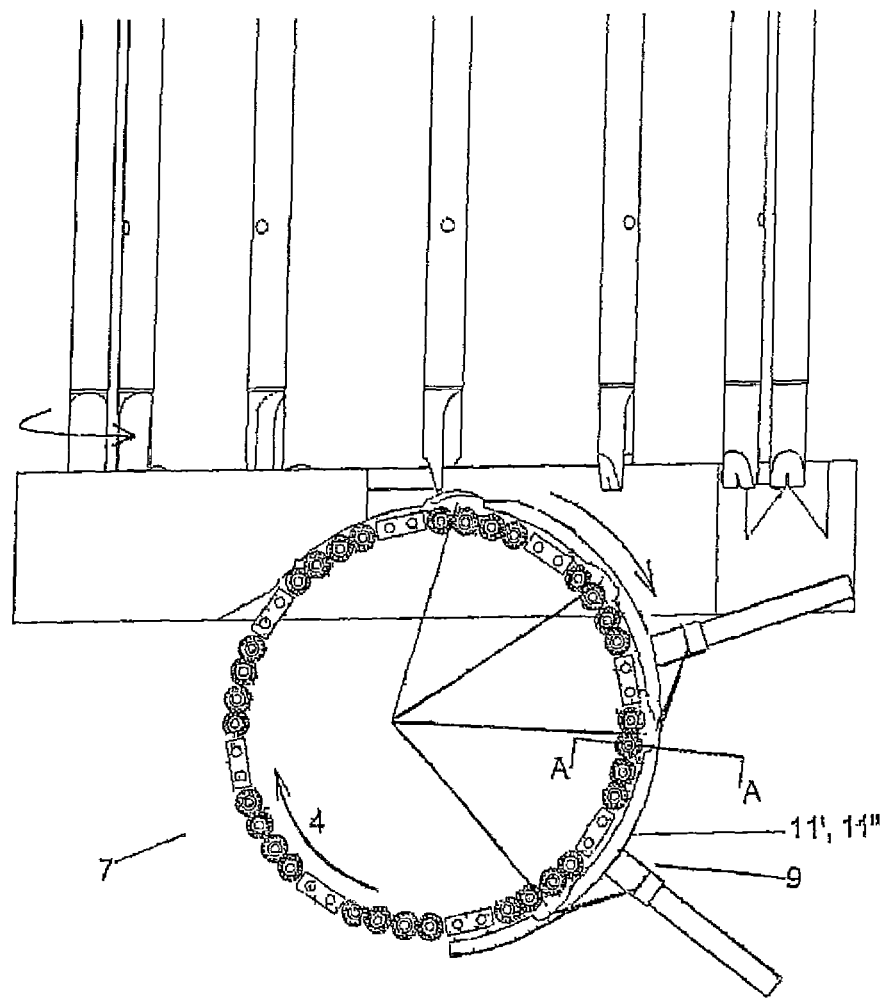
Fig. 2A
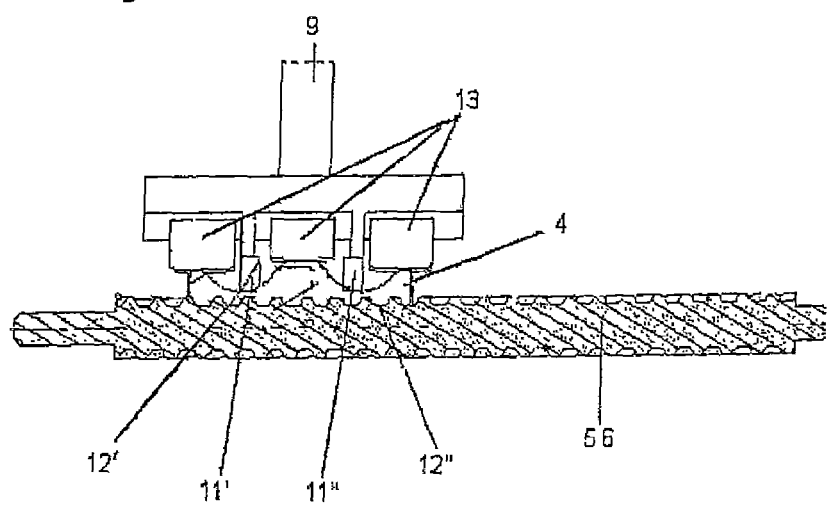
Fig. 2B  A-A

B-B

C-C

GIZZARD PEELER AND METHOD OF PEELING A GIZZARD

FIELD OF THE INVENTION

The invention relates to a method of peeling a gizzard having an inner skin and an outer skin. The method can include the steps of opening the gizzard so as to expose its irregularly shaped outer skin in an essentially flat position and processing the gizzard's inner skin by contacting the inner skin with a processing means. The invention can further relate to a gizzard peeler that includes a series of rollersets, each rollerset having a first roller and a second roller that in use rotate in opposite directions, wherein the rollersets collectively form a cylindrical wall of a rotatable drum or form part of such a wall.

BACKGROUND OF THE INVENTION

Both a method of peeling a gizzard and a gizzard peeler that may be used therewith are described in the applicant's earlier European patent application, which is yet unpublished and carries the application number 08102829.2. In the just mentioned European patent application, the rollersets are rotatable around a central body axis of a drum, which drum constitutes a revolving enclosure for the gizzard. The individual rollers of the drum execute a combined dual rotation, i.e. a rotation along their own axis and a rotation around the central body axis of the drum. In order to arrange that the first roller and the second roller of each rollerset are rotatable in opposite directions, both rollers have teeth that intermesh. Furthermore, the first roller of each rollerset is provided with teeth that intermesh with a stationary gear plate. There is also a rotatable plate provided with a circular series of holes, each hole receiving an axis of a first roller. When the rotatable plate rotates, it takes along the first rollers of each rollerset, and due to their teeth intermeshing with the stationary gear plate, the first roller of each rollerset executes a dual rotation both along its own body axis and around the body axis of the drum. The second roller of each rollerset will also execute such a dual rotation albeit that the rotation around its own body axis will be opposite to the rotation of the first roller of said rollerset.

Prior to receiving the gizzard in the enclosure of the drum, the gizzard is opened so as to expose its irregularly shaped outer skin in an essentially flattened position. The gizzard's inner skin can then be contacted by the cooperating first and second rollers of each rollerset forming part of the drum's inner wall.

It is an object of the invention to improve the performance the previously described gizzard peeler and to provide a method of peeling a gizzard having improved results as compared to the method as described in the above-mentioned European patent application.

SUMMARY OF THE INVENTION

Objects and advantages of the invention will be set forth in part in the following description, or may be obvious from the description, or may be learned through practice of the invention. The gizzard peeler and the method of peeling a gizzard in accordance with the invention are to this end characterized by one or more of the appended claims.

In an exemplary aspect, the method of the invention includes that, during processing of the gizzard's inner skin, pressure is exerted on the gizzard's outer skin with a predefined distribution of pressure along the outer skin so as to cause that the gizzard's entire inner skin area is exposed to pressurized contact with the processing means.

It is then preferred to either apply pressure at selected positions of the gizzard's outer skin or to apply pressure at the entire area of the gizzard's outer skin. The preferred option may be selected depending on the circumstances and the desired peeling result.

In order for the gizzard peeler as described in the European patent application EP 08102829.2 can operate in accordance with the invention, it is preferred that the gizzard peeler has the feature that the drum is provided at its outer circumference with a guide and pressure means for guiding and pressing a gizzard along at least a part of the drum's outer circumference. In this manner, the present invention departs from the invention set forth in EP 08102829.2 to process the gizzard at the inside of the drum. Contrary thereto, in the instant invention, the processing of the gizzard is effected on the drum's outer circumference.

There are several embodiments possible for arranging guide and pressure means at the drum's outer circumference that may be selected depending on the circumstances of the situation. In all embodiments, however, following its opening the gizzard can have its entirely exposed inner skin remain in contact with the drum's outer circumference.

In some embodiments it is preferred that the guide and pressure means include a brush or brushes.

One particular embodiment has the feature that the guide and pressure means include one brush having radially extending brush-fingers, at least some of which contact one or more rollersets.

It may then also be desirable that the brush is rotatable albeit that it is also possible that the brush is stationary.

In other embodiments, it may be preferable that the guide and pressure means include a strip or strips at a predefined distance along at least a part of the drum's outer circumference that follow the drum's curvature so as to define a slit or slits for receiving therein a part of the gizzard.

A preferred realization of the just mentioned embodiment is arranged such that the strip or strips are supported by pressure exerting means so as to cause that the predefined distance is variable and the gizzard in the slit receives a preferred amount of pressure.

In this just mentioned preferred embodiment, there are again several options available for the pressure exerting means. Preferably these pressure exerting means are selected from the group including brushes and spring loaded bodies.

In still another embodiment, the gizzard peeler of the invention has the feature that the strip or strips are stationary and that the guide and pressure means further include adjacent to the strip or strips one or more resiliently supported bodies for pressing the gizzard against the drum.

It is remarked that the above-mentioned embodiments employing a strip or strips along at least a part of the drum's outer circumference have the beneficial effect that the time a gizzard is kept in contact with the drum's outer circumference for processing the gizzard's inner skin is extended. As a consequence, the processing efficiency of the gizzard peeler of the invention provided with such a strip or strips is improved and at a high standard.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures. Using the figures, the invention will hereinafter be further elucidated with reference to some exemplary embodiments of the gizzard peeler of the present invention.

FIG. 2A shows the exemplary first embodiment of FIG. 1 in a side view;

FIG. 2B shows a cross-sectional view according to the line A-A in FIG. 2A;

DETAILED DESCRIPTION

Figure 1:
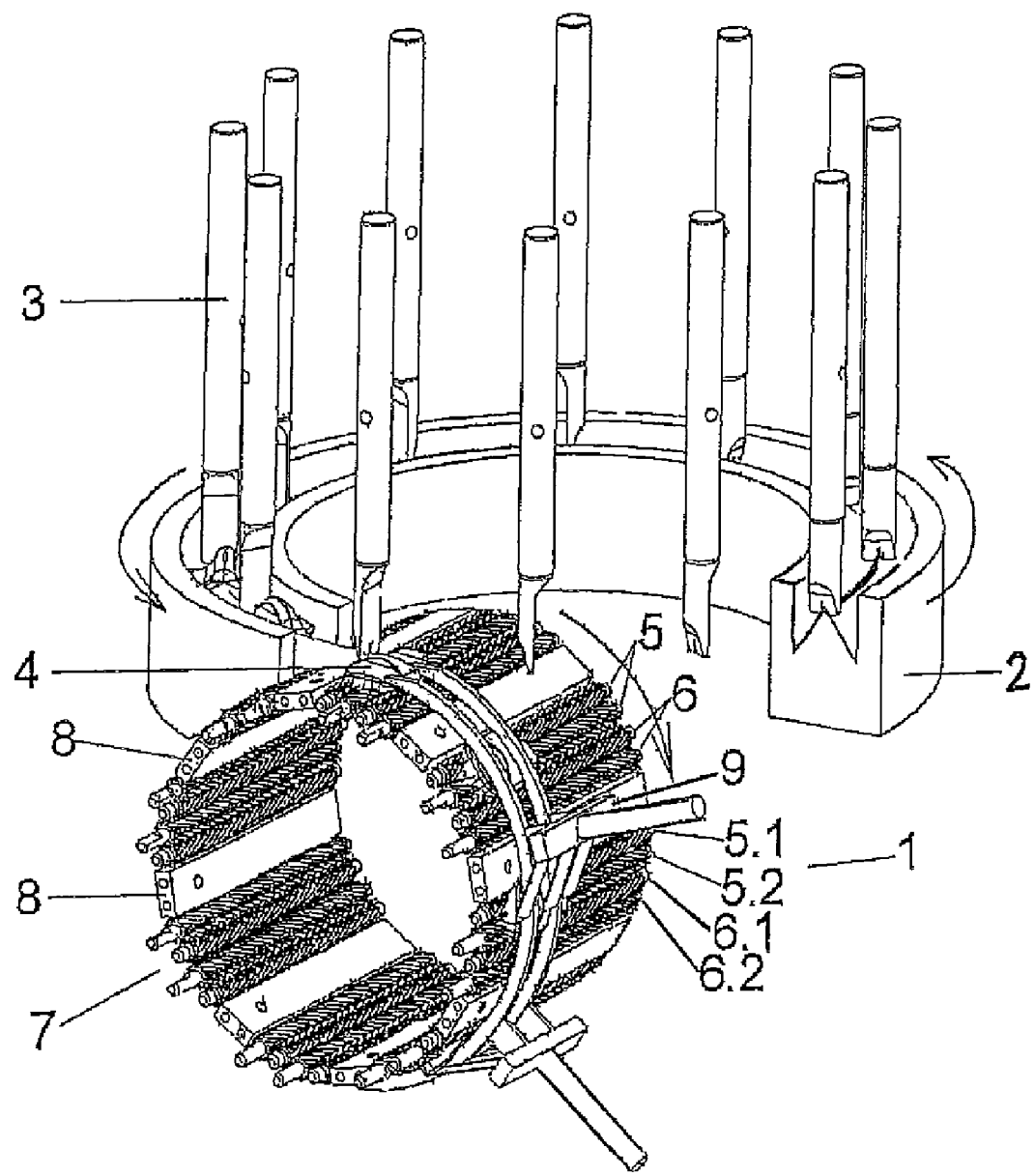
FIG. 1 provides a perspective view of the gizzard peeler of the invention according to an exemplary first embodiment, wherein it is shown as a processing means subsequent to a means for opening the gizzard.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference first to FIG. 1 a series of pushers 3 is shown that move a gizzard or gizzards along a circularly shaped device 2 for opening the gizzard so as to expose its irregularly shaped outer skin in an essentially flat position when it leaves this device and enters the gizzard peeler 1 for processing the gizzard's inner skin. The operation and construction of the device 2 for opening the gizzard 4 is fully described in European patent application EP 08102829.2 which document is to be deemed fully incorporated and inserted herein.

Considering that the process of opening the gizzard so as to expose its irregularly shaped outer skin forms no part of the invention, a further discussion of this operation can be dispensed with. However, for clarity purposes the above brief discussion is offered in order to provide the artisan with sufficient guidance as to how to open a gizzard, although it must be understood that opening a gizzard per se is a well known technique for the person skilled in the art.

As mentioned above, after opening the gizzard, the processing of the gizzard's inner skin is carried out by contacting that inner skin with processing means, notably by the operation of the gizzard peeler 1 of the invention.

As clearly shown in FIG. 1, the gizzard peeler 1 of the invention includes a series of rollersets 5, 6. Each rollerset 5, 6 includes a first roller 5.1, 6.1 and a second roller 5.2, 6.2 that rotate in opposite directions during use. For this purpose, each first and second roller of a rollerset 5, 6 are provided with intermeshing teeth. Further, at least one selected roller of each rollerset is driven as a consequence of which both rollers of a rollerset execute the intended rotation in opposite directions.

Furthermore, the rollersets 5, 6 collectively form a cylindrical wall of a drum 7 or as shown in the exemplary embodiment in FIG. 1, such rollersets 5, 6 form part of such a cylindrical wall, whereby the rollersets 5, 6 may be interrupted by fixtures 8. The fixtures 8 together with the rollersets 5, 6, however, collectively form the cylindrical wall of the drum 7. The drum 7 is also rotatable causing that the individual first rollers and second rollers of the respective rollersets 5, 6 each perform a combined dual rotation both around their own body axis and around the body axis of the drum 7.

Figure 3A:
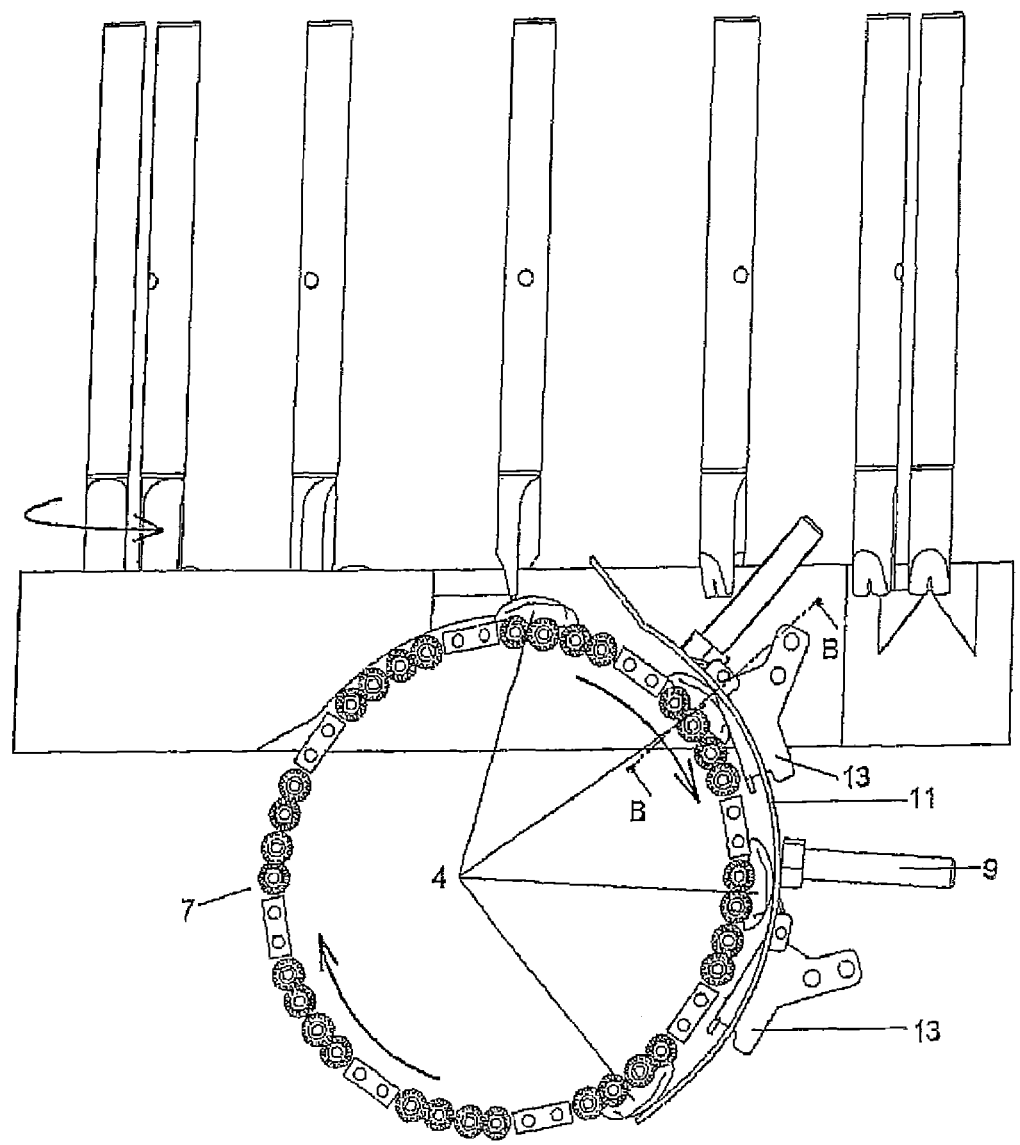
FIG. 3A shows a second exemplary embodiment of the gizzard peeler of the invention in a side view.
Figure 4A:
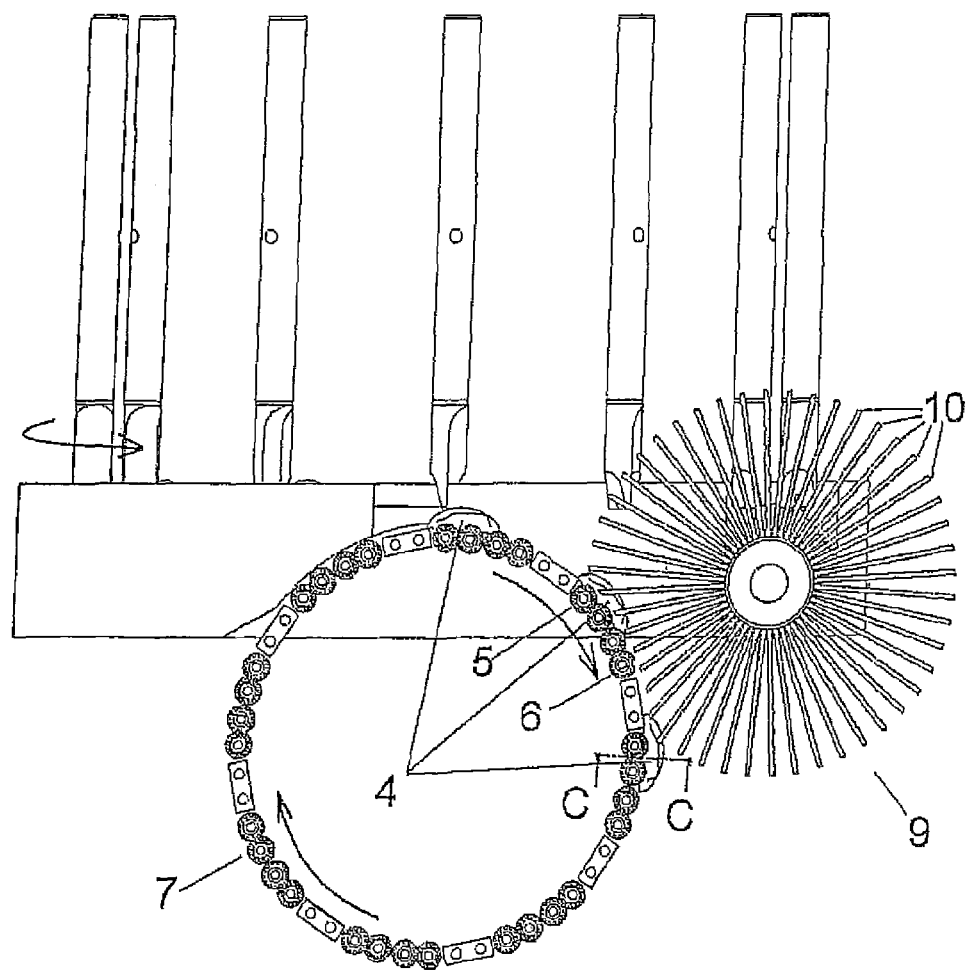
FIG. 4A shows a third exemplary embodiment of the gizzard peeler of the invention in a side view.

As FIG. 1 further shows, but which can also be seen in FIG. 2A, FIG. 3A and FIG. 4A, the drum 7 is at its outer circumference provided with guide and pressure means 9 for guiding and pressing a gizzard 4 along at least part of the outer circumference of the drum 7.

Figure 4B:
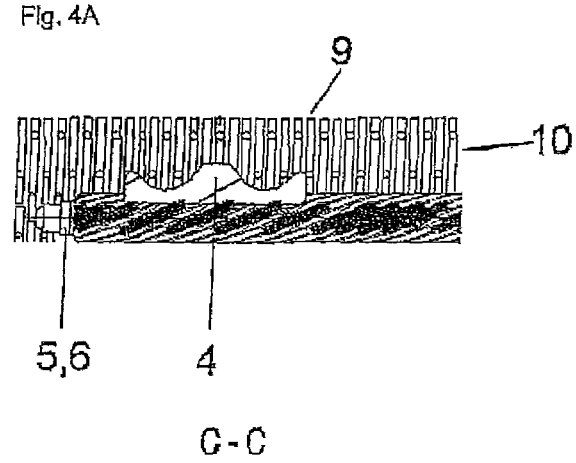
FIG. 4B, shows a cross-sectional view of the gizzard peeler according to the line C-C in FIG. 4A.

With reference further to FIGS. 4A and 4B an embodiment is shown in which the guide and pressure means 9 is realized as a brush having radially extending brush-fingers 10, at least some of which contact one or more rollersets 5, 6. The gizzard to be peeled is thus caught between the brush-fingers 10 and the rollersets 5, 6 that process the inner skin of the gizzard, as more clearly shown in FIG. 4B. To improve the effect of guidance and pressurizing the gizzard 4, the brush 9 may be rotatable so as to be able to follow the gizzard 4 as it moves along with the rotational speed of the drum 7.

Figure 3B:
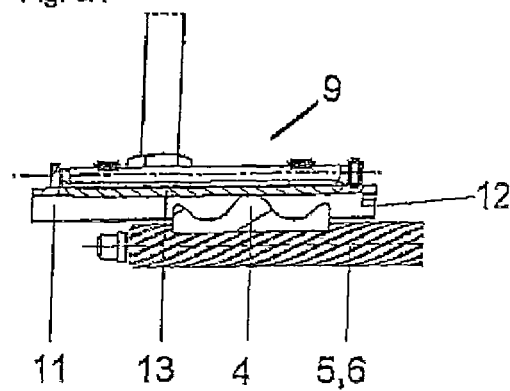
FIG. 3B shows a cross-sectional view of the exemplary gizzard peeler according to the line B-B in FIG. 3A.

In the preferred embodiment shown in FIGS. 3A and 3B the guide and pressure means 9 include a strip 11 along at least a part of the outer circumference of the drum 7. The strip 11 follows as clearly shown in FIG. 3A the drum's curvature so as to define a slit 12 (as best seen in FIG. 3B) for receiving the gizzard 4 therein. The strip 11 is supported by pressure exerting means 13 so as to cause that the predefined distance that the strip assumes in relation to the drum's outer circumference is variable, and to cause that the gizzard 4 that is received in the slit 12 experiences a preferred amount of pressure depending on the pressurizing force exerted by the pressure exerting means 13. It is noted that the pressure exerting means 13 of this embodiment shown in FIG. 3A and FIG. 3B may be spring-loaded bodies or brushes.

A further embodiment is shown in FIG. 2A and FIG. 2B wherein the gizzard 4 is received in dual slits 12', 12" for which purpose also two strips 11', 11" are applied at a predefined distance along at least a part of the outer circumference of the drum 7. Also these strips 11', 11" therefore have to follow the drums curvature so as to accurately define the slits 12', 12" for receiving therein (parts of) the gizzard 4 to be processed by the respective rollersets 5, 6 of the drum 7.

In this embodiment the strips 11', 11" are stationary and the guide and pressure means 9 further include—as most clearly shown in FIG. 2B—one or more resiliently supported bodies 13 for pressing the gizzard 4 at selected positions against the rollersets 5, 6 of the drum 7.

The applicant expressly points out that the essence of the invention is to exert pressure for at least some time to the gizzard's outer skin in order to promote the processing of the gizzard's inner skin, and that many embodiments are feasible within the scope of the invention concerning the way the gizzard peeler is construed in order to enjoy the benefits of the invention. The afore-given detailed description with reference to several embodiments of the gizzard peeler of the invention is therefore to be understood strictly for illustrative purposes without intend to restrict the scope of protection of the appended claims to anything else than corresponds to the contribution that the invention provides to the prior art.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A device for peeling gizzards, comprising:
   a series of rollersets, each said rollerset comprising a first roller and a second roller that in use rotate in opposite directions, wherein said rollersets collectively form a cylindrical wall of a rotatable drum or form part of such a cylindrical wall; and
   guide and pressure means provided at the outer circumference of said drum and configured for guiding and pressing a gizzard along at least a part of said drum's outer circumference.

2. A device for peeling gizzards as in claim 1, wherein said guide and pressure means comprises a brush or brushes.

3. A device for peeling gizzards as in claim 1, wherein said guide and pressure means comprises a brush having radially-extending brush fingers, wherein at least one of said fingers is in contact with at least one of said rollersets.

4. A device for peeling gizzards as in claim 3, wherein said brush is not rotatable.

5. A device for peeling gizzards as in claim 1, wherein said guide and pressure means comprises a strip or strips positioned at a predefined distance along at least a part of the outer circumference of said drum and following the drum's curvature so as to define a slit or slits for receiving therein a part of the gizzard.

6. A device for peeling gizzards as in claim 5, wherein said strip or strips are supported by pressure exerting means so as to cause the predefined distance to be variable and the gizzard in said slit receives a preferred amount of pressure.

7. A device for peeling gizzards as in claim 6, wherein said pressure exerting means are selected from the group comprising brushes and spring loaded bodies.

8. A device for peeling gizzards as in claim 5, wherein said strip or strips are stationary and said guide and pressure means further comprises one or more resiliently supported bodies adjacent to said strip or strips for pressing the gizzard against said drum.

9. A method of peeling a gizzard having an inner skin and an outer skin, comprising the steps of:
   opening the gizzard so as to expose its irregularly shaped outer skin in an essentially flat position;
   processing the gizzard's inner skin by contacting said inner skin with a series of rollersets, wherein during said processing step pressure is exerted on the gizzard's outer skin with a predefined distribution of pressure along said outer skin so as to cause that the gizzard's entire inner skin area is exposed to pressurized contact with said series of rollersets.

10. A method of peeling a gizzard as in claim 9, wherein said predefined distribution of pressure along the outer skin is selected from the group consisting of applying pressure at the selected positions of the gizzard's outer skin, and applying pressure at the entire area of the gizzard's outer skin.

* * * * *